(12) United States Patent
Shmilovich et al.

(10) Patent No.: US 9,573,680 B2
(45) Date of Patent: Feb. 21, 2017

(54) METHOD AND APPARATUS FOR ROBUST LIFT GENERATION

(71) Applicant: The Boeing Company, Chicago, IL (US)

(72) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 480 days.

(21) Appl. No.: 14/637,288

(22) Filed: Mar. 3, 2015

(65) Prior Publication Data

US 2016/0375986 A1 Dec. 29, 2016

Related U.S. Application Data

(62) Division of application No. 13/689,507, filed on Nov. 29, 2012, now Pat. No. 9,108,725.

(51) Int. Cl.
*B64C 21/04* (2006.01)
*B64C 9/38* (2006.01)
*B64C 21/08* (2006.01)

(52) U.S. Cl.
CPC ............. *B64C 21/04* (2013.01); *B64C 9/38* (2013.01); *B64C 21/08* (2013.01)

(58) Field of Classification Search
CPC ............ B64C 21/04; B64C 9/38; B64C 21/08
See application file for complete search history.

(56) References Cited

U.S. PATENT DOCUMENTS

| | | | | |
|---|---|---|---|---|
| 3,581,995 A | * | 6/1971 | Fischer | B64C 9/38 239/265.11 |
| 3,724,784 A | * | 4/1973 | Von Ohain | B64C 23/005 244/207 |
| 3,841,588 A | * | 10/1974 | Arnold | B64C 23/005 244/207 |
| 3,887,146 A | * | 6/1975 | Bright | B64C 29/00 244/12.1 |
| 3,893,638 A | * | 7/1975 | Kelley | B64C 15/00 244/12.5 |
| 3,920,203 A | * | 11/1975 | Moorehead | B64C 21/04 244/110 B |
| 4,019,696 A | * | 4/1977 | Hirt | B64C 21/00 244/200.1 |
| 4,391,424 A | * | 7/1983 | Bartoe, Jr. | B64C 9/32 244/110 B |
| 4,392,621 A | * | 7/1983 | Viets | B64C 9/38 137/829 |
| 4,447,028 A | * | 5/1984 | Wang | B64C 9/00 244/207 |
| 4,600,172 A | * | 7/1986 | Loth | B64C 21/04 244/207 |

(Continued)

*Primary Examiner* — Justin Benedik
(74) *Attorney, Agent, or Firm* — McDonnell Boehnen Hulbert & Berghoff LLP

(57) ABSTRACT

A system and method for robust lift generation through flow separation suppression are presented. A fluid flow is ejected over a lifting surface from a fluid ejection orifice, and a flow direction of the fluid flow over the lifting surface is directed using a plurality of vanes configured in the fluid ejection orifice. The flow direction is rotated in a span-wise direction over the lifting surface by swiveling the vanes.

20 Claims, 11 Drawing Sheets

(56) References Cited

U.S. PATENT DOCUMENTS

| | | | | |
|---|---|---|---|---|
| 4,645,140 A * | 2/1987 | Bevilaqua | ............... | B64C 21/04 239/265.11 |
| 4,674,717 A * | 6/1987 | Loebert | ................... | B64C 21/04 244/207 |
| 5,062,588 A * | 11/1991 | Garland | ................... | F02K 1/002 244/12.4 |
| 5,806,808 A * | 9/1998 | O'Neil | ...................... | B64C 9/22 244/201 |
| 6,109,565 A * | 8/2000 | King, Sr. | ................. | B64C 3/141 244/12.1 |
| 6,682,021 B1 * | 1/2004 | Truax | ...................... | B64C 23/06 138/38 |
| 6,926,229 B2 * | 8/2005 | Cummings | ............. | B64C 15/02 244/12.5 |
| 7,823,840 B2 | 11/2010 | Shmilovich et al. | | |
| 7,878,458 B2 | 2/2011 | Shmilovich et al. | | |
| 8,087,618 B1 | 1/2012 | Shmilovich et al. | | |
| 2006/0102801 A1 * | 5/2006 | Manley | ................... | B64C 21/04 244/208 |

* cited by examiner

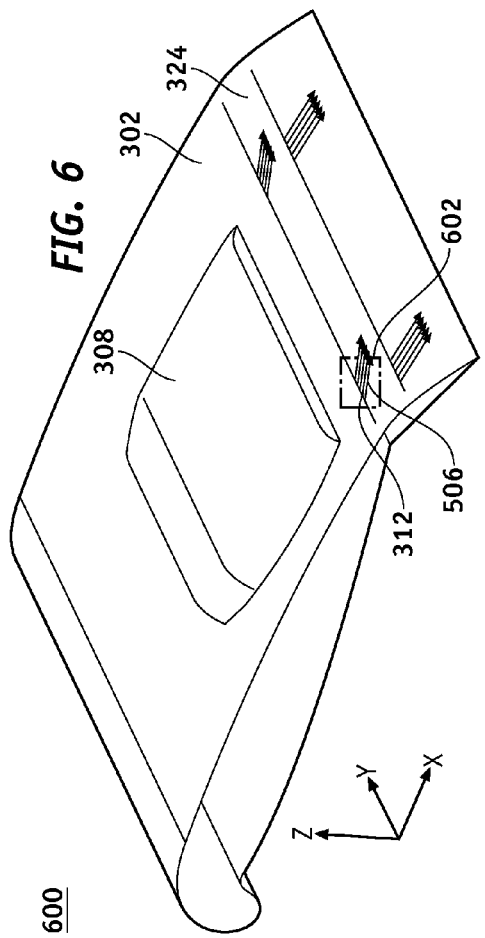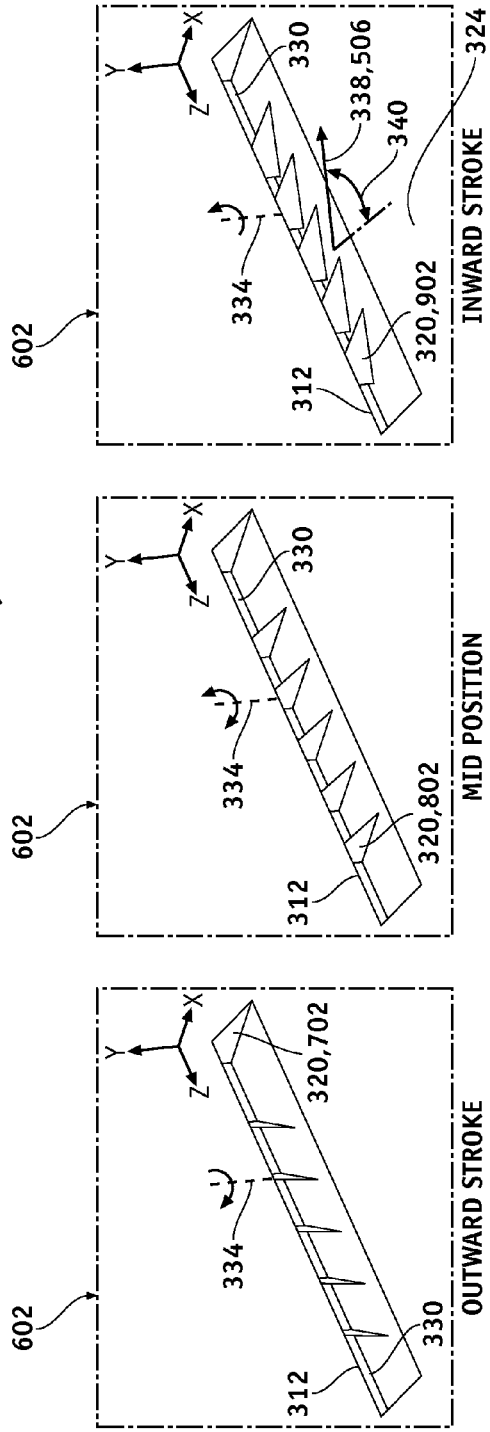

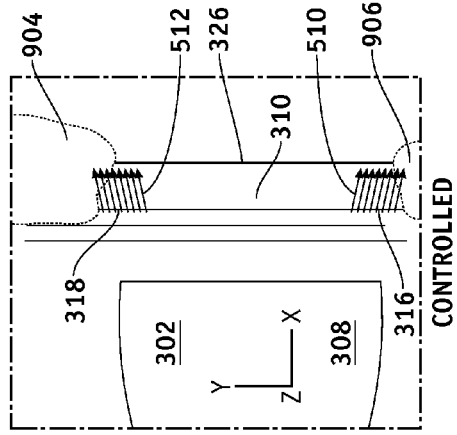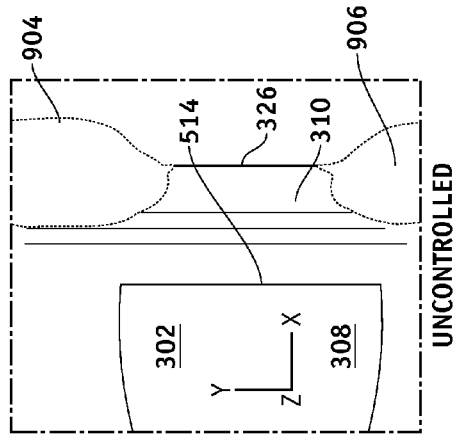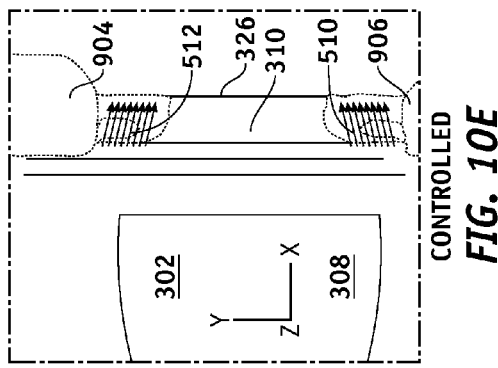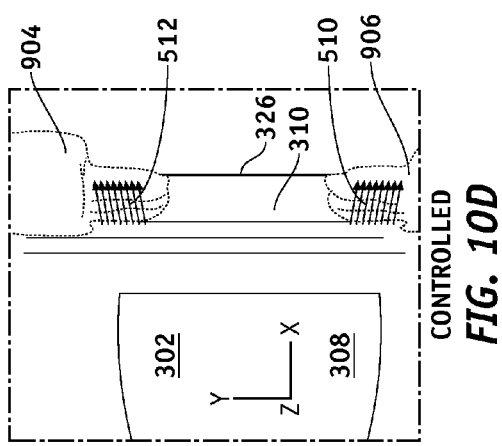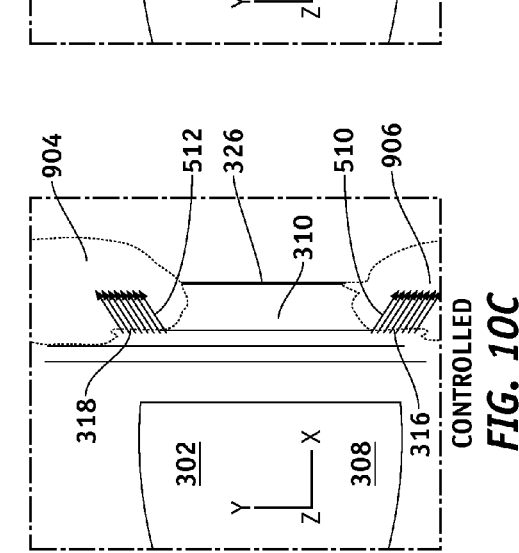

UNCONTROLLED

CONTROLLED

CONTROLLED

CONTROLLED

UNCONTROLLED

UNCONTROLLED

UNCONTROLLED

CONTROLLED

CONTROLLED

CONTROLLED

CONTROL OFF

CONTROL ON

METHOD AND APPARATUS FOR ROBUST LIFT GENERATION

CROSS-REFERENCE TO RELATED APPLICATION

The present application is a divisional of U.S. patent application Ser. No. 13/689,507, filed on Nov. 29, 2012.

FIELD

Embodiments of the present disclosure relate generally to fluid-dynamic design. More particularly, embodiments of the present disclosure relate to controlling engine exhaust in an aircraft, and increasing engine-powered lift produced along a surface of an aircraft through control of engine exhaust.

BACKGROUND

Scientists and engineers continue to seek improvements in all areas of aircraft performance. Recent military campaigns, for example, have demonstrated an increased need for improved short takeoff and landing (STOL) performance to allow aircraft to operate in environments where sophisticated airports and other landing facilities may not be available. In particular, it is desirable to create aircraft that are able to takeoff and/or land even on relatively short runways with even better STOL performance than current designs.

SUMMARY

A system and method for enhanced lift generation via flow separation suppression are presented. A fluid flow is ejected over a lifting surface from a fluid ejection orifice, and a flow direction of the fluid flow over the lifting surface is directed using a plurality of vanes configured in the fluid ejection orifice. The flow direction is rotated in a span-wise direction over the lifting surface by swiveling the vanes periodically. The vanes can also deflect a constant blowing jet to a given angle. The vanes can rotate the flow direction depending on the operational condition.

In an embodiment, a method for flow separation suppression ejects a fluid flow over a lifting surface from a fluid ejection orifice, and directs a flow direction of the fluid flow over the lifting surface using a plurality of vanes configured in the fluid ejection orifice. The method further rotates the flow direction in a span-wise direction over the lifting surface by swiveling the vanes.

In another embodiment, a flow separation suppression system for enhanced lift generation for a fluid dynamic body comprises a cowling, an exhaust stream, a fluid ejection slot, rotatable vanes, and a controller. The cowling extends outwardly from a surface of the fluid dynamic body. The exhaust stream is directed over the fluid dynamic body toward an aft end of the fluid dynamic body by the cowling. The fluid ejection slot directs a compressed fluid substantially parallel to and along a surface of the fluid dynamic body to enhance attachment of the exhaust stream to the fluid dynamic body. The rotatable vanes are hinged to the fluid ejection slot and swivel periodically around their axis from side to side to direct the compressed fluid through the fluid ejection slots. The controller controls the rotatable vanes and a flow of the compressed fluid through the fluid ejection slot based on operational conditions.

In a further embodiment, a method for providing a flow separation suppression system for enhanced lift generation for a fluid dynamic body configures a cowling extending outwardly from a surface of a fluid dynamic body. The method further operates an engine coupled to the fluid dynamic body to generate an exhaust stream that is predominantly directed over the fluid dynamic body toward an aft end of the fluid dynamic body by the cowling. The method further configures a fluid ejection slot to direct a compressed fluid substantially parallel to and along the surface of the fluid dynamic body to enhance attachment of the exhaust stream to the fluid dynamic body.

The method further configures a duct extending from a compressed fluid source and coupled to the fluid ejection slot on a surface of the fluid dynamic body to transmit the compressed fluid from the compressed fluid source to the surface of the fluid dynamic body. The method further configures a plurality of swiveling vanes hinged to the fluid ejection slot to oscillate periodically around their axis from side to side from a parallel flow stream to a swiveling jet angle to actuate the exhaust stream through the fluid ejection slots to generate a time varying jet efflux. The method further configures the plurality of swiveling vanes at a vane angle to control the swiveling vanes based on operational conditions.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 6 is an illustration of a perspective view of an exemplary flow separation suppression system for controlling engine exhaust flow along an aircraft wing using swiveling vanes according to an embodiment of the disclosure.

FIG. 7 is an illustration of an expanded view of a portion of FIG. 6 showing an instantaneous snapshot of time varying swiveling vanes in an outward (relative to the centerline of the engine) stroke position during a periodic cycle according to an embodiment of the disclosure.

FIG. 8 is an illustration of an expanded view of a portion of FIG. 6 showing an instantaneous snapshot of time varying swiveling vanes in a midpoint position during a periodic cycle according to an embodiment of the disclosure.

FIG. 9 is an illustration of an expanded view of a portion of FIG. 6 showing an instantaneous snapshot of time varying swiveling vanes in an inward (relative to the centerline of the engine) stroke position during a periodic cycle according to an embodiment of the disclosure.

FIGS. 10A-10E are illustrations of an exemplary operation of a flow separation suppression system showing a flow pattern during one actuation cycle of the time varying swiveling vanes shown in FIGS. 7-9 caused by a periodic motion of the time varying swiveling vanes at a time varying swiveling vane angle according to an embodiment of the disclosure.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid actuation, vehicle structures, fluid dynamics, flight control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, an aircraft airfoil. Embodiments of the disclosure, however, are not limited to such aircraft airfoil applications, and the techniques described herein may also be utilized in other applications. For example but without limitation, embodiments may be applicable to hydrofoils, wind turbines, tidal power turbines, or other fluid dynamic body that can travel through a fluid.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
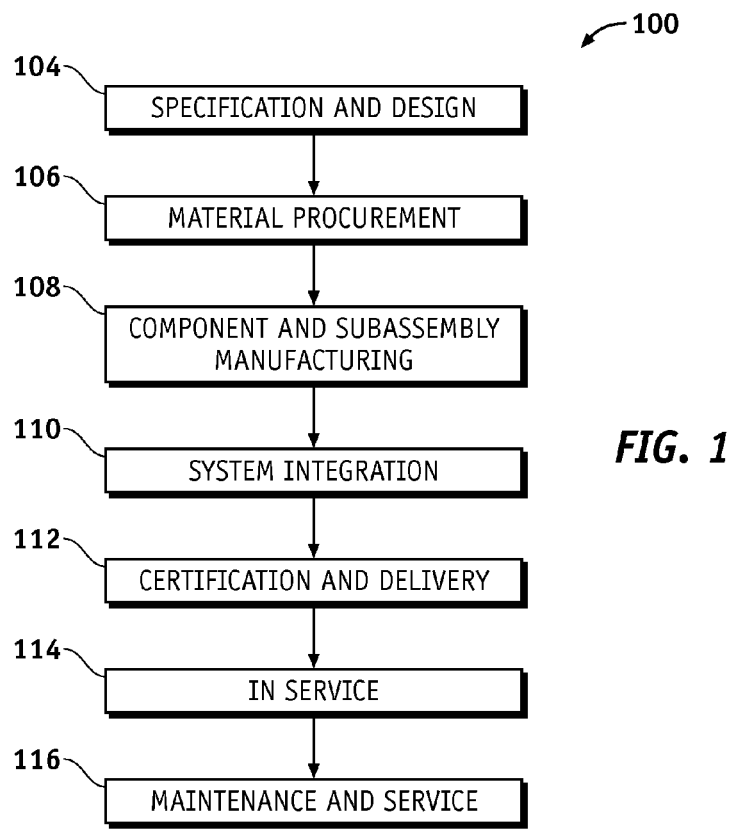
FIG. 1 is an illustration of a flow diagram of an exemplary aircraft production and service methodology.
Figure 2:
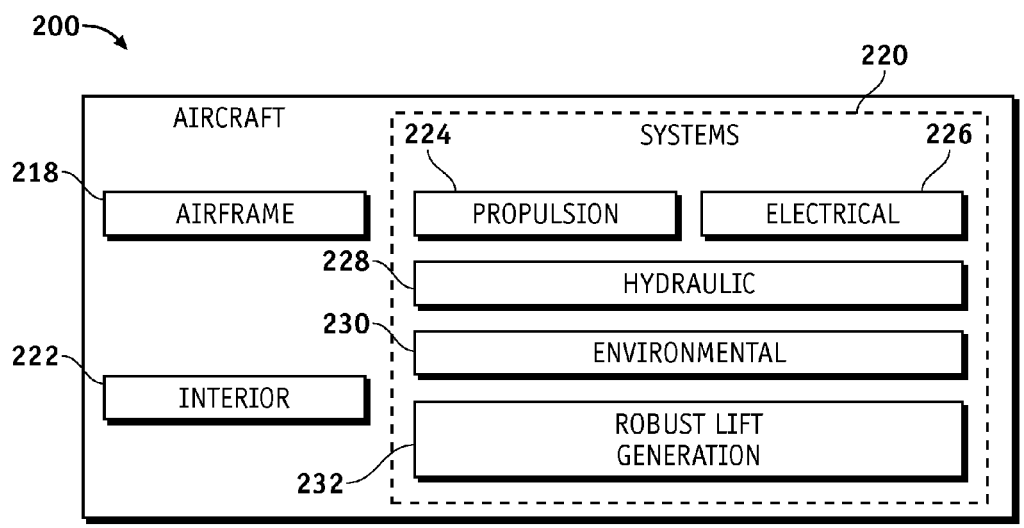
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a robust lift generation system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

One way to improve short takeoff and landing (STOL) performance is to increase an amount of lift produced along airfoil surfaces of an aircraft. The airfoil surfaces may comprise surfaces of wing, flap, spoiler, or other lift surfaces or control surfaces. By increasing the amount of lift produced by each wing, for example, the aircraft can become airborne at a lower airspeed, thereby reducing a runway length needed for takeoff. Various aircraft designs have attempted to maximize an amount of lift produced along an airfoil surface through exploitation of a well-known Coanda Effect. In many of these designs, air moving over the wing can be deflected towards the ground using flaps and a jet blowing over a curved surface to increase the amount of lift produced. Aircraft have successfully exploited the Coanda Effect for STOL purposes. Nevertheless, there remains a desire for aircraft designs with even better STOL performance.

Figure 3:
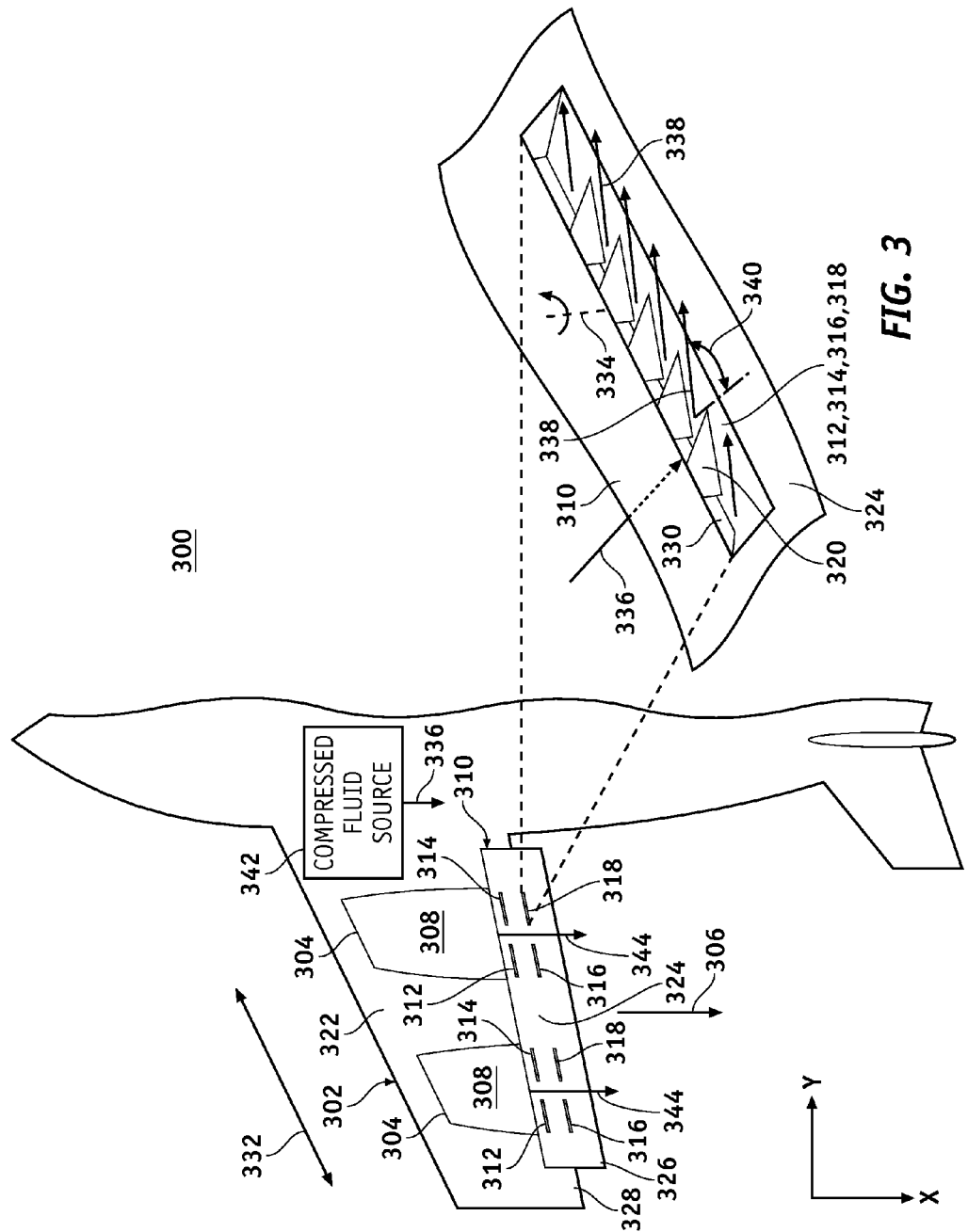
FIG. 3 is an illustration of a top view of an exemplary aircraft with improved lift capabilities produced through control of engine exhaust flow according to an embodiment of the disclosure.

FIG. 3 is an illustration of a top view of a portion of an exemplary aircraft 300 with improved lift capabilities produced through control of engine exhaust flow according to an embodiment of the disclosure. The aircraft 300 may comprise one or more wings 302 that produce lift in response to a fluid flow across an upper surface 322 (surface 322) of the wings 302. In various embodiments, the aircraft 300 exploits Coanda Effects produced along the wings 302 for improved STOL performance.

The aircraft 300 may comprise any number of engines 304 that produce exhaust gases such as an exhaust stream 344 expelled along a surface 322 of each of the wings 302 toward a rear end 306 of the aircraft 300. The exhaust stream 344 from the engine 304 may emanate from the cowlings 308, for example, which suitably extend outwardly from the surface 322 of the wing 302. The exhaust stream 344 may alternately be applied to the wings 302 from sources other than cowlings 308, such as a nozzle or other structure attached to the engine 304.

The exhaust stream 344 may be directed along an upper flap surface 324 of a flap 310 or other control surface associated with the wings 302 as appropriate. In various embodiments, the flap(s) 310 are extended during takeoffs and/or landings that demand STOL performance, and the exhaust stream 344 from the cowlings 308 suitably flows across the upper flap surface 324 of the flap(s) 310 to provide increased lift using Coanda Effects. In some embodiments, the aircraft 300 is designed to exploit "upper surface blowing" (USB) principles wherein exhaust stream 408 from the engine 304 is directed along the surface 322 of each of the wings 302, the flap 310 and/or other fluid dynamic body to maximize lift produced.

In various embodiments, two-dimensional airflow across the upper flap surface 324 of the flap 310 is encouraged through a use of ducts (414, 416 and/or 418, in FIG. 4) that provide streams of compressed fluid 336 from a compressed fluid source 342 to the surface 322 of the wings 302. By properly injecting fluid flow such as a jet efflux 338 along the surface 322 of the wings 302, the exhaust stream 344 is encouraged to efficiently turn along the upper flap surface 324 of the flap 310 (rather than peeling away from the upper flap surface 324), thereby increasing Coanda Effects and augmenting total lift.

The fluid ejection slots may be implemented as small openings in the wings 302 that inject the compressed fluid 336 when actuated. An array of fluid ejection slots 312, 314, 316, and 318 (fluid ejection orifices 312, 314, 316, and 318) located on the upper flap surface 324 of the flap 310 is used to extract a controlled amount of the compressed fluid 336. The fluid ejection slots 312, 314, 316, and 318 in the wings 302 can be arranged, for example, in any manner and at any size to distribute fluid conducted by the ducts. In the exemplary aircraft 300, four fluid ejection slots 312, 314, 316, and 318 are located on the flap 310 downstream of the cowling 308. The fluid ejection slots 312, 314, 316, and 318 are capable of directing the compressed fluid 336 as desired, and as described in more detail below.

Figure 15:
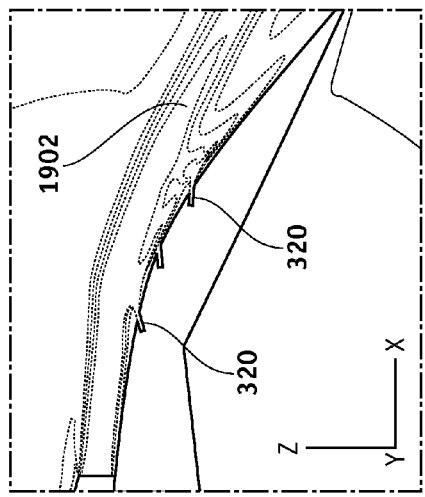
Figure 20:
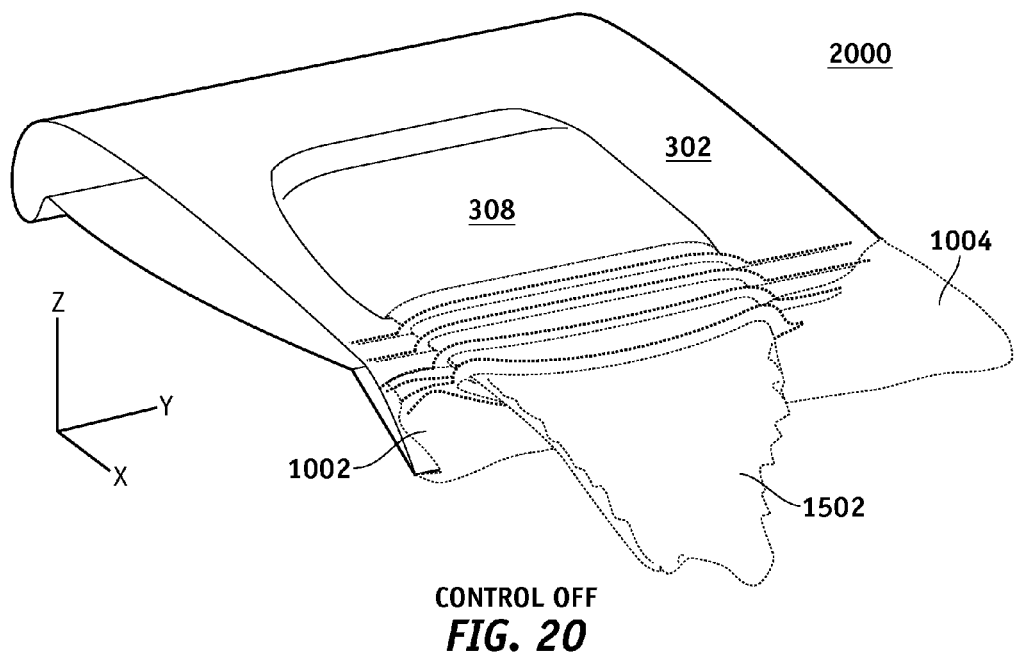
FIG. 20 is an illustration of an exemplary uncontrolled operation of an engine exhaust flow system showing an uncontrolled exhaust plume of FIG. 15 at a no injected fluid flow condition of FIG. 11.

In the embodiment shown in FIG. 3, the fluid ejection slots 312, 314, 316, and 318 are arranged with respect to the left and right edges of each of the cowlings 308 in order to impart momentum in a manner that locally suppresses flow separation along the upper flap surface 324 of the flap(s) 310, thereby postponing edge vortices of an exhaust plume 1802 (FIGS. 18 and 21) that may otherwise form as in an uncontrolled exhaust plume 1502 (FIGS. 15 and 20). Alternate embodiments may comprise different fluid ejection slot arrangements that omit or modify any of the fluid ejection slots 312, 314, 316, and 318. The fluid ejection slots 312, 314, 316, and 318 may be alternately organized such that a spacing between the fluid ejection slots 312, 314, 316, and 318 is variable. For example, a distance between fluid ejection slots may increase toward a flap trailing edge 326 or a wing trailing edge 328. Any number of fluid ejection slots may be arranged in any direction, such as, for example, parallel or at an orifice angle (not shown) to the exhaust stream 344.

The fluid ejection slots 312, 314, 316, and 318 may be, for example, alternately designed to be angled (not shown) at least partially away from the exhaust plume 1802. The fluid ejection slots 312, 314, 316, and 318 may be at an angle of 20-40 degrees or so to direct the exhaust stream 408 across a wider section of the flap 310. Alternately, the fluid ejection slots 312, 314, 316, and 318 may be oriented to be approximately parallel or perpendicular to the exhaust stream 408. Moreover, fluid emanating from the fluid ejection slots 312, 314, 316, and 318 may be differently oriented. For example, the fluid ejection slots 312, 314, 316, and 318 may be oriented in any direction perpendicular to a primary axis of each of the fluid ejection slots 312, 314, 316, and 318, or at any orifice angle. Other embodiments may be arranged in various configurations.

The aircraft 300 can produce enhanced lift through exploitation of Coanda Effects produced along the surface 322 of the wings 302 as appropriate. One or more aircraft engines such as engines 304 are operated to produce the exhaust stream 344 that can be directed along the surface 322 of the wings 302 to produce or augment lift. While most of the exhaust plume 1802 is generally directed with the cowling 308, nozzle and/or other structure, the compressed fluid 336 (emanating from the engine 304 prior to the exhaust stream 344 leaving the cowling 308, or the nozzle) can be ducted to the fluid ejection slots 312, 314, 316, and 318 as desired to encourage two dimensional fluid flow along the surface 322 of the wings 302.

However, a pattern of an exhaust plume such as the exhaust plume 1802 depends on engine power setting, flap deflection and flight conditions based on operational conditions of the aircraft 300. At takeoff the engine power setting is high and flap deflection is moderate, whereas landing requires very high flap deflection and low engine power.

Figure 4:
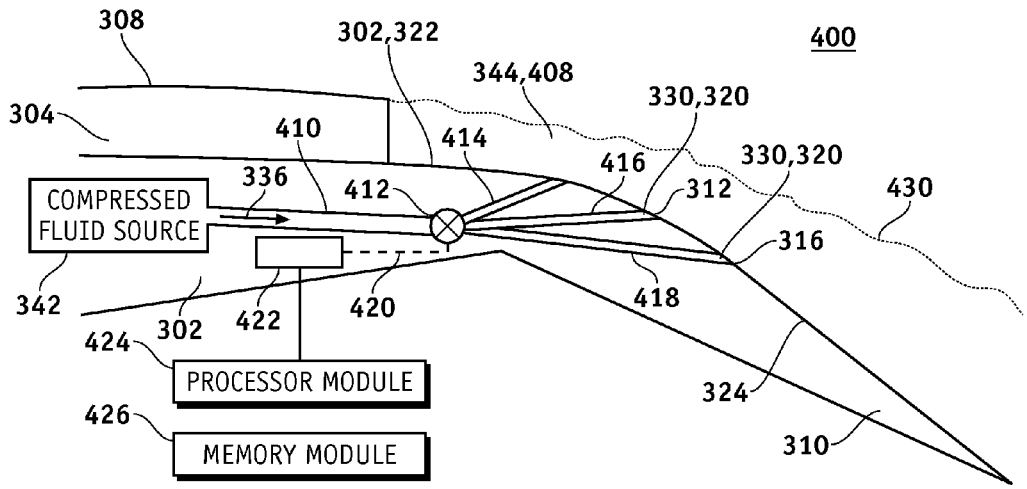
FIG. 4 is an illustration of a side view of a cut through of an exemplary flow separation suppression system for controlling engine exhaust flow in an aircraft according to an embodiment of the disclosure.
Figure 21:
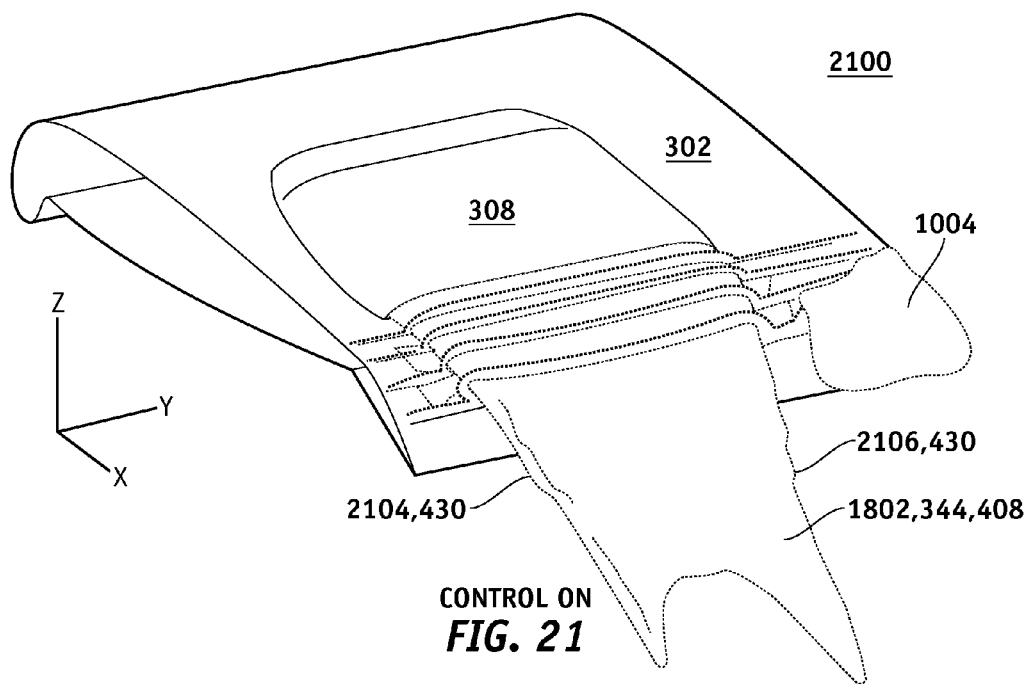
FIG. 21 is an illustration of an exemplary controlled operation of an engine exhaust flow system showing a controlled engine plume of FIG. 18 at a jet efflux condition of FIG. 12B caused by a non-periodic motion of non-time varying swiveling vanes at a non-time varying swiveling vane angle according to an embodiment of the disclosure.

Since the location of edges 430 of the exhaust stream 344/408 as shown in FIG. 4 (or edges 2104/2106 of the exhaust plume 1802 as shown in FIG. 21) varies, different operational conditions place conflicting requirements on fluid ejection slot placement. An a priori optimal positioning of the fluid ejection slots may not be possible, which poses a design challenge for an efficient integrated system. A flow separation suppression system 400 configured to mitigate this problem using swiveling vanes 320 or rotatable vanes 320 is described in more detail in the context of discussion of FIG. 4 below.

To account for variable locations of the edges 430 (as shown in FIG. 4) or edges 2104/2106 (as shown in FIG. 21) of the exhaust stream 344 at various operational conditions, each of the fluid ejection slots 312, 314, 316, and 318 comprises a plurality of the swiveling vanes 320 (rotatable vanes 320) hinged thereto.

Actuation of the swiveling vanes 320 may be based on a continuous jet through movable vanes that swivel periodically from side to side at a time varying swiveling angle as explained in more details in the context of discussion of FIGS. 7-9 and 10A-10B below. In this embodiment, the swiveling vane angle 340 changes periodically and is not held constant at a constant angle and as such is referred to as a time varying swiveling vane angle 340 varying in angle with time. Also, the jet efflux 338 in this embodiment is referred to as a time varying jet efflux 338 varying in rate and other flow characteristics with time. Similarly, the swiveling vanes 320 are referred to as time varying swiveling vanes 320 varying their angular position with time.

Each of the time varying swiveling vanes 320 is configured to swivel periodically from side to side to actuate a swiveling jet through each of the fluid ejection slots 312, 314, 316, and 318 to produce the time varying jet efflux 338. The time varying jet efflux 338 produces a wide time-averaged coverage area that is very effective when used in conjunction with variable locus of the edges 430 or 2104/2106 of the exhaust stream 344 as explained in more detail below.

Alternatively, actuation of the swiveling vanes 320 may be based on a continuous jet through movable vanes that swivel non-periodically at a non-time varying swiveling vane angle as explained in more details in FIGS. 11-19 below. The swiveling vane angle 340 in the embodiment shown in FIGS. 11-19 is referred to as a non-time varying swiveling vane angle 340 held at a substantially constant angle, and the jet efflux 338 is referred as a non-time varying jet efflux 338 held at a substantially constant rate. Similarly, the swiveling vanes 320 are referred to as non-time varying swiveling vanes 320 when held at a substantially constant angular position. Thus, the non-time varying swiveling vanes 320 are used for deflecting a non-time varying blowing jet such as the non-time varying jet efflux 338 to a given/non-time varying angle such as the non-time varying swiveling vane angle 340, depending on a given operational condition.

The time varying swiveling vanes 320 are used at a given flow condition and at a given frequency depending on the given operational condition. This type of actuation is more effective than holding the non-time varying swiveling vanes 320 at the (fixed) non-time varying swiveling vane angle 340, since the actuation of the time varying swiveling vanes 320 requires less bleed.

The time varying swiveling vanes 320 and the non-time varying swiveling vanes 320 may collectively be referred to as the swiveling vanes 320, rotating vanes 320, or vanes 320 when their common features are described herein. Similarly, the time varying swiveling vane angle 340 and the non-time varying swiveling vane angle 340 may collectively be referred to as the swiveling vane angle 340 when their common features are described herein. Time varying jet efflux, vectors, injection flow, and jet flux may be used interchangeably in this document.

The jet efflux 338 (also presented as vectors 506, 508, 510 and 512 in FIG. 5) produces a wide coverage area that is very effective when used in conjunction with variable locus of edges 430 of the exhaust stream 408.

Each of the swiveling vanes 320 is coupled to a vertical axis 334 anchored to a structure of the flap 310. The swiveling vanes 320 are hinged to a rack 330 which may periodically move in a linear back and forth fashion in a span-wise direction 332 to generate a linear rack motion. The swiveling vanes 320 may be shaped in any manner and at any size to account for variable locations of the edges 430 of the exhaust stream 344 at various operational conditions for effectively deflecting the jet efflux 338. Alternate embodiments may comprise different swiveling vanes 320 arrangements that omit or modify any of the swiveling vanes 320. The swiveling vanes 320 may be alternately organized such that a spacing between the swiveling vanes 320 is variable. Any number of swiveling vanes 320 may be arranged. The swiveling vanes 320 and the fluid ejection slots 312, 314, 316, 318 are covered by a cover (not shown) during non-operation.

The linear rack motion causes the time varying swiveling vanes 320 to cyclically rotate about their respective vertical axes 334 at a given frequency and within predefined azimuth bounds. The predefined azimuth bounds may comprise, for example but without limitation, about 60 degrees, or other bound. This effectively causes a continuous jet such as the time varying jet efflux 338 to fan out through the time varying swiveling vane 320 at the time varying swiveling vane angle 340 with respect to a downstream direction of the exhaust stream 344 off the upper flap surface 324. In this manner, a slew motion of the ejecting fluid such as the time varying jet efflux 338 provides a wide region of influence for reducing flow separation effect caused by the edges 430 or 2104/2106 of the exhaust stream 344 at various operational conditions.

The swiveling vane angle 340 may be, for example but without limitation, about 30 degrees to about 40 degrees, or other range suitable for operation of the swiveling vanes 320. A controlled motion of the rack 330 and the swiveling vanes 320 assembly may be predetermined in order to achieve best volume coverage and maximum upper surface blowing (USB) effect over a range of operational conditions. The swiveling vanes 320 may be activated during takeoff, approach and/or landing as explained in more detail below using a controller to suppress a flow separation over the fluid dynamic body.

Since a domain of influence of the flow separation suppression system 400 is large, the flow separation suppression system 400 provides a robust STOL capability over a range of operational conditions. The swiveling jet actuators such as the swiveling vanes 320 are small and require less input for actuation than existing systems, which may be advantageous for system integration, with implications to weight, space and engine bleed requirements. A requirement of engine bleed can impact a size of an engine, where a larger bleed amount can result in a heavier engine, leading to increased airplane gross weight. In addition, engine efficiency can be reduced due to bleed.

FIG. 4 is an illustration of a side view of a cut through of an exemplary flow separation suppression system 400 (system 400) for enhanced lift generation in an aircraft according to an embodiment of the disclosure. The system 400 may comprise, the compressed fluid source 342, the swiveling vanes 320, the rack(s) 330, input ducts 410, output ducts 414, 416, 418, control valves 412, and a controller 422.

The ducts 414, 416 and/or 418 are each configured to provide streams of the compressed fluid 336 from the compressed fluid source 342 through one or more input ducts 410 into the exhaust stream 408 from the engine 304. The streams of the compressed fluid 336 through the one or more input ducts 410 are directed to the surface 322 of the wing 302, the upper flap surface 324 of the flap 310 and/or surface of other control surfaces or lift surfaces comprising an airfoil as appropriate. In the exemplary embodiments shown in FIG. 4, a relatively small amount (e.g., on an order of about 1% to about 2%) of the compressed fluid 336 is extracted through the ducts 414, 416, 418 and directed within the wing 302 or other lift surface to the upper flap surface 324 of the flap 310 or other control surface.

The input ducts 410 and the output ducts 414, 416, 418 may be arranged in any manner. In the exemplary embodiment shown in FIG. 4, fluid from a single input duct 410 is provided to multiple output ducts 414, 416, 418 by a single valve assembly such as the control valves 412. In practice, the number of input and/or output ducts may vary, and may be interconnected in any manner using any number of valves or other inter-connecting structures. As noted above, fluid may be input into the duct 410 from any source associated with the engine 304.

The various ducts contained within the wings 302 may be arranged in any manner. Ducts may originate within any portion of the engine 304, for example, such as the engine compressor or engine fan, or from any other source of bleed air and/or exhaust. Any number of ducts may be provided, and embodiments with multiple ducts may arrange and/or group the ducts in any manner desired to achieve desired results. In many embodiments, the various ducts terminate at a fluid ejection slot (fluid ejection orifice) or other opening in the wings 302.

The compressed fluid source 342 may comprise, for example but without limitation, a compressor portion of the engine 304, a bleed air source of the engine 304, a fan portion of the engine 304, a dedicated electrical compressor, or other compressed fluid source. Thus, the compressed fluid 336 may emanate from the compressor portion of the engine 304, the bleed air source of the engine 304, the fan portion of the engine 304, and/or a dedicated electrical compressor. The compressed fluid 336 may also be obtained from the exhaust stream 408.

For example, an engine fan flow from the fan portion of the engine 304 may be used as the compressed fluid source 342 for controlling the exhaust stream 344/408. Such embodiments may provide an added advantage in that fan bleed can provide cooling of the flap 310 and/or other airfoil/control surfaces in addition to enhanced aerodynamic performance. For another example, the compressed fluid 336 such as a compressed air may be obtained from the bleed air source of the engine 304 that may be a source commonly used to provide bleed air for de-icing, cabin pressurization, pneumatic actuation and/or any other purpose. As such, the control valves 412 and/or the ducts 410, 414, 416, 418 may be implemented using conventional "bleed air" components commonly used for other purposes on many conventional aircraft.

Fluid ducts such as the ducts 414, 416, 418 may be manually or automatically be activated at any portion of flight, for example, the ducts 414, 416, 418 may be active during takeoffs, landings, and/or other times that flap(s) 310 or other control surfaces are deployed. In some embodiments, various ducts may be deactivated during level flight or other periods when enhanced lift is not be needed. Furthermore, jets such as the time varying jet efflux 338 through the fluid ejection slots 312, 314, 316, 318 may be adjusted in order to control the injection of fluid at important locations, depending on flight conditions, engine power setting and/or flap deflection. For example, fluid injection may be administered at different locations (e.g., through segments of fluid ejection slots 312, 314, 316, 318) and at different intensities and orientations for takeoff, approach to landing, and landing.

The control valves 412 are configured to allow or disallow a fluid to flow through the ducts 414, 416 and/or 418 as appropriate. The control valves 412 may be any sort of mechanically and/or electrically controlled valve capable of being opened, closed and/or otherwise actuated in response to a control signal 420 provided by the controller 422.

The controller 422 is configured to control the swiveling vanes 320 and a flow of the compressed fluid 336 through at least one of the fluid ejection slots 312, 314, 316, and 318 based on operational conditions.

The controller 422 activates the control valves 412 which distribute the extracted fluid such the compressed fluid 336 through the input ducts 410. The compressed fluid 336 is discharged into the exhaust stream 408 (344 in FIG. 3) at select locations using the fluid ejection slots 312, 314, 316, and 318 on the upper flap surface 324 of the flap 310. Each of the fluid ejection slots 312, 314, 316, and 318 comprises the swiveling vanes 320 that control/direct the fluid flow such as the jet efflux 338 ejected from the fluid ejection slots 312, 314, 316, and 318. Vertical swiveling vanes 320, swiveling vanes 320, and rotatable vanes 320 may be used interchangeably in this document.

As mentioned in an embodiment above, each of the time varying swiveling vanes 320 is configured to swivel periodically from side to side to actuate the time varying jet efflux 338 through each of the fluid ejection slots 312, 314, 316, and 318. The time varying jet efflux 338 produces a wide coverage area that is very effective when used in conjunction with variable locus of the edges 430 or 2104/2106 of the exhaust stream 344/408.

Each of the swiveling vanes 320 is coupled to the vertical axis 334 anchored to the flap 310 as shown in FIG. 3. The swiveling vanes 320 are hinged to the rack 330, which may periodically move at a time varying swiveling vane angle 340 in a linear back and forth fashion in a span-wise direction 332 as shown in FIGS. 7-9 below to generate a linear rack motion. The swiveling vanes 320 may also be held at a fixed non-time varying swiveling vane angle 340.

The linear rack motion causes the time varying swiveling vanes 320 to cyclically rotate about their respective vertical axes 334 at a given frequency and within predefined azimuth bounds. This effectively causes a continuous jet such as the time varying jet efflux 338 to fan out at the swiveling vane angle 340 (FIG. 3) off the upper flap surface 324 as shown in FIGS. 6-9 below. In this manner, a slew motion of ejecting fluid such as the time varying jet efflux 338 provides a wide region of influence for reducing edge effects of the exhaust stream 344/408.

The rack 330 may be, for example, electrically, hydraulically or pneumatically driven. For a pneumatically driven rack 330, a swiveling vanes pump (not shown) also powered by bleed of the exhaust stream 408 can be used.

A controlled motion of the rack 330 and the swiveling vanes 320 assembly may be predetermined in order to achieve best volume coverage and maximum USB effect over a range of operational conditions. The swiveling vanes 320 may be activated during takeoff, approach and/or landing as explained in more detail below using a controller.

In a conventional STOL application, the exhaust stream 344/408 generated by the engine 304 is primarily applied to the upper flap surface 324 of the flap 310 and/or other control surface using an engine nozzle, the cowling 308 and/or other structures as appropriate. As the exhaust stream 344/408 curves along the upper flap surface 324 in accordance with the Coanda Effect, lift is produced. By placing control valve(s) such as at least one of the control valves 412 into a proper position or state, the compressed fluid 336 from the compressed fluid source 342 is applied through the input duct 410, and ducts 414, 416, and/or 418 to the fluid ejection slots 312 and 316 to prevent the exhaust stream 344/408 from peeling away from the upper flap surface 324, which would otherwise reduce an amount of lift produced.

As a result, actuation of the control valves 412 may result in selective enhancement of lift produced by the wing 302 through improved Coanda Effects of the exhaust stream 408 flowing across the upper flap surface 324. Exhaust fluid stream, exhaust stream, and fluid flow may be used interchangeably in this document.

The controller 422 may comprise, for example but without limitation, a processor module 424, a memory module 426, or other module. The controller 422 may be implemented as, for example but without limitation, a part of an aircraft system, a centralized aircraft processor, a subsystem computing module comprising hardware and/or software devoted to the system 400, or other processor.

The controller 422 is configured to control the control valves 412 and other elements of the system 400 to direct the actuation of control valves 412 to transmit the compressed fluid 336 on the surface 322 of the wing 302 and the upper flap surface 324 as appropriate according to various operational conditions. The controller 422 is also configured to control a periodic oscillation frequency of the swiveling vanes 320 and a rate of the fluid flow of the compressed fluid 336 based on operational conditions. The periodic oscillation frequency may comprise for example but without limitation, 10 Hz, 12 Hz, or other frequency.

The operational conditions may comprise, for example but without limitation, flight conditions, ground operations, or other conditions. The flight conditions may comprise, for example but without limitation, landing, takeoff or other flight condition. The ground operations may comprise, for example but without limitation, air breaking after landing, taxing, parking, or other ground operation. The controller 422 may further switchably allow a portion of the compressed fluid 336 to pass through the duct 410 in a first operating state of the aircraft 300 and prevent the portion of compressed fluid 336 from passing through the duct 410 in a second operating state of the aircraft 300 as explained above.

The controller 422 may be located remotely from the system 400, or may be coupled to the system 400. In one embodiment, the controller 422 may be placed in a cockpit of the aircraft 300. For example, the control valve 412 may be activated manually by a pilot or a crew member or automatically by the controller 422 as various operational conditions are detected.

The processor module 424 comprises processing logic that is configured to carry out the functions, techniques, and processing tasks associated with the operation of the system 400. In particular, the processing logic is configured to support the system 400 described herein. For example, the processor module 424 may direct the control valves 412 to transmit the compressed fluid 336 on the upper surface 322 (surface 322) of the wing 302 as appropriate based on various operational conditions. For another example, the processor module 424 may direct a control motion of the rack 330 and the swiveling vanes 320 assembly based on a predetermined order to achieve best volume coverage and maximum USB effect over a range of the operational conditions.

The processor module 424 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 426 may comprise a data storage area with memory formatted to support the operation of the system 400. The memory module 426 is configured to store, maintain, and provide data as needed to support the functionality of the system 400. For example, the memory module 426 may store flight configuration data, the control signal(s) 420 for activation of the control valves 412, predetermine motion of the rack 330 and the swiveling vanes 320 assembly, or other data.

In some embodiments, the memory module 426 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 426 may be coupled to the processor module 424 and configured to store, for example but without limitation, a database, and the like. Additionally, the memory module 426 may represent a dynamically updating database containing a table for updating the database, or other application. The memory module 426 may also store, a computer program that is executed by the processor module 424, an operating system, an application program, tentative data used in executing a program, or other application.

The memory module 426 may be coupled to the processor module 424 such that the processor module 424 can read information from and write information to the memory module 426. For example, the processor module 424 may access the memory module 426 to access an aircraft speed, an angle of attack, a Mach number, an altitude, engine power setting, flap deflection, the control signal(s) 420 for activation of the control valves 412, the predetermine motion of the rack 330 and the swiveling vanes 320 assembly, the swiveling vane angle 340, or other data.

As an example, the processor module 424 and memory module 426 may reside in respective application specific integrated circuits (ASICs). The memory module 426 may also be integrated into the processor module 424. In an embodiment, the memory module 426 may comprise a cache memory for storing temporary variables or other intermediate information during execution of instructions to be executed by the processor module 424.

System 400 is not meant to imply physical or architectural limitations to the manner in which different embodiments may be implemented. Other components in addition to and/or in place of the ones illustrated may be used. Some components may be unnecessary in some embodiments. Also, the blocks are presented to illustrate some functional components. One or more of these blocks may be combined and/or divided into different blocks when implemented in different embodiments.

Figure 5:
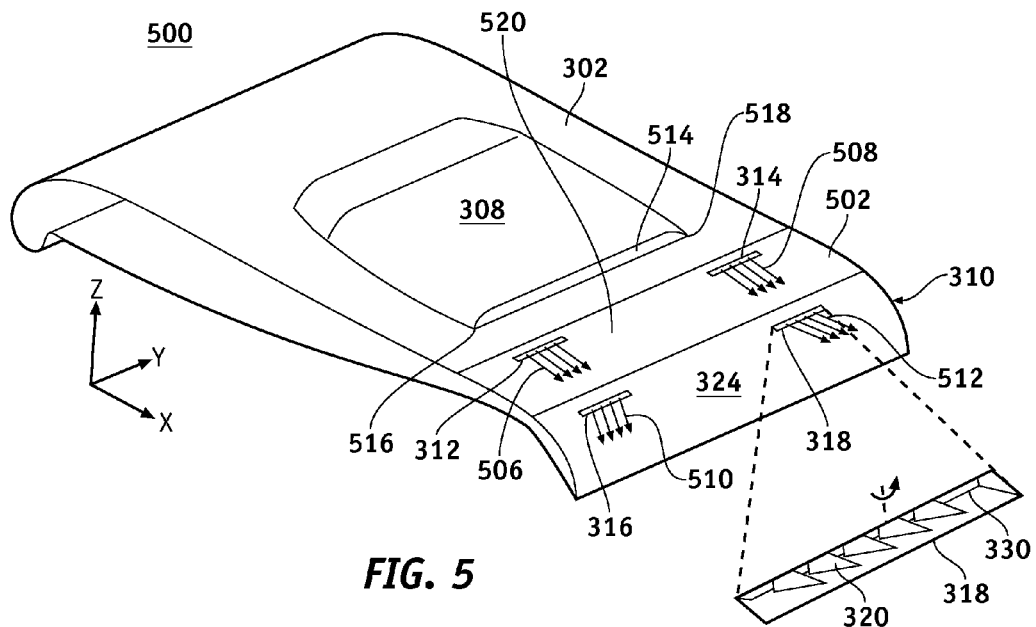
FIG. 5 is an illustration of a perspective view of an exemplary flow separation suppression system for controlling engine exhaust flow along an aircraft wing according to an embodiment of the disclosure.

FIG. 5 is an illustration of a perspective view of an exemplary flow separation suppression system 500 for controlling engine exhaust flow along an aircraft wing such as each of the wings 302 according to an embodiment of the disclosure. An array of the fluid ejection slots 312-318 located on the upper flap surface 324 of the flap 310 is used to extract a controlled amount of the engine exhaust such as the exhaust stream 408 (fluid flow). As explained above, the controller 422 activates the control valves 412 which distribute the extracted fluid (fluid flow) through the ducts 410, 414, 416, and 418.

The extracted fluid is discharged into the exhaust stream 408 at select locations using the fluid ejection slots 312-318 on the upper flap surface 324 of the flap 310. Each of the fluid ejection slots 312-318 comprises the swiveling vanes 320 that direct a flow direction of the fluid flow. Each of the swiveling vanes 320 is operable to rotate the flow direction in a span-wise direction 332 over the wing 302 by swiveling periodically at the time varying swiveling vane angle 340 or by being held non-periodically at a fixed non-time varying swiveling vane angle 340.

Exhaust emanating from the trailing (aft) edge 514 of the cowling 308 may be encouraged to follow a sudden curved region 502 produced due to downwards deflection of the flap 310 and flap trailing edge 326 through an application of the fluid ejection slots 312, 314, 316 and 318. The curved region 502 is sometimes referred to as hinge line. In this embodiment, the fluid ejection slots 312 and 314 are formed on the curved region 502, whereas the fluid ejection slots 316 and 318 are formed on a mid-flap region of the flap 310 as appropriate. The fluid ejection slots 312, 314, 316, 318 may be aligned or angled in any manner to affect an exhaust plume 2102 (FIG. 21) emanating from the cowling 308. A jet efflux of compressed fluid passing through the fluid ejection slots 312, 314, 316, and 318 are represented with vectors 506, 508, 510, and 512 respectively.

Each of the fluid ejection slots 312, 314, 316, 318 comprises the swiveling vanes 320 configured to swivel periodically or non-periodically to actuate the jets through the fluid ejection slots 312, 314, 316, 318 as explained above. In this manner, the swiveling vanes 320 direct a flow direction of the fluid flow over the wing 302. For example, the time varying jet efflux 338 caused by the periodic motion of the time varying swiveling vanes 320 produces a wide coverage area that is very effective when used in conjunction with variable locus of the edges 430 or 2104/2106 of the exhaust stream 344/408.

While FIG. 5 shows each of the fluid ejection slots 312, 314, 316, 318 generally aligned to be parallel to and downstream from the aft edge 514 of cowling 308, other embodiments (such as that shown in FIG. 3) may align some or all of the fluid ejection slots 312, 314, 316, 318 and the swiveling vanes 320 differently.

FIG. 6 is an illustration of a perspective view of an exemplary flow separation suppression system 600 for controlling the exhaust stream 344/408 along the wing 302 using the swiveling vanes 320 according to an embodiment of the disclosure. In one embodiment, each of the swiveling vanes 320 is configured to swivel periodically from side to side as illustrated by the vectors 506, 508, 510, and 512 (jet efflux 338 in FIG. 3) through the fluid ejection slots 312, 314, 316, 318 respectively. In this case, the time varying swiveling vanes 320 are used at a given flow condition and at a given frequency depending on the operational condition. This type of actuation is more effective than just holding the swiveling vanes 320 at the (fixed) non-time varying position, since it requires less bleed. In another embodiment, the swiveling vanes 320 are used for deflecting a non-time varying blowing jet such as the non-time varying jet efflux 338 to a given angle such as the non-time varying swiveling vane angle 340, depending on the operational condition.

FIGS. 7-9 show instantaneous snapshots of the time varying swiveling vanes 320 at various phases of actuation during a periodic cycle. These instantaneous positions are the results of actuation frequency and azimuthal bounds that may be preprogrammed in the controller 422 to determine the predetermined motion of the time varying swiveling vanes 320 at a given operational condition.

FIG. 7 is an illustration of expanded view of a portion 602 of FIG. 6 showing an instantaneous snapshot of the time varying swiveling vanes 320 in an outward stroke position 702 during a periodic cycle according to an embodiment of the disclosure. The outward stroke position 702 is relative to the centerline of the engine 304.

FIG. 8 is an illustration of expanded view of the portion 602 of FIG. 6 showing an instantaneous snapshot of the time varying swiveling vanes 320 in a midpoint position 802 during a periodic cycle according to an embodiment of the disclosure.

FIG. 9 is an illustration of expanded view of the portion 602 of FIG. 6 showing an instantaneous snapshot of the time varying swiveling vanes 320 in an inward stroke position 902 during a periodic cycle according to an embodiment of the disclosure. The inward stroke position 902 is relative to the centerline of the engine 304.

FIGS. 10A-10E are illustrations of an exemplary operation of the flow separation suppression system 400-600 showing a flow pattern during one actuation cycle of the time varying swiveling vanes 320 shown in FIGS. 7-9 caused by a periodic motion of the time varying swiveling vanes 320 at the time varying swiveling vane angle 340 according to an embodiment of the disclosure.

In the embodiments shown in FIGS. 10A-10E, each of the time varying swiveling vanes 320 is configured to swivel periodically from side to side through the fluid ejection slots 312, 314, 316 and 318 respectively. The time varying swiveling vanes 320 are used at a given flow condition and at a given frequency depending on an operational condition. As mentioned above, this type of actuation can be more effective and use less bleed air from the engine 304 than holding the non-time varying swiveling vanes 320 at a non-time varying swiveling vane angle 340.

As explained above, each of the time varying swiveling vanes 320 is configured to swivel periodically from side to side to actuate a jet through each of the fluid ejection slots 312, 314, 316, and 318 to produce the time varying jet efflux 338. The time varying jet efflux 338 produces a wide coverage area that is very effective when used in conjunction with variable locus of location of the edges 430 of the exhaust stream 344/408 in FIG. 4.

An effectiveness of a span-wise rotation actuation method is examined on a nozzle configuration using a pair of actuation fluid ejection slots 316 and 318 located at a given distance from the cowling 308. A lateral location of each fluid ejection slot 316 and 318 is chosen such that a swiveling motion of the actuated jets represented by the vectors 510 and 512 will be effective for an exhaust plume 1802 (FIG. 18) at various operational conditions. A periodic oscillation frequency of the time varying swiveling vanes 320 and a rate of the fluid flow are controlled based on operational conditions. For example, the time varying swiveling vanes 320 are actuated such that each time varying jet efflux 510 and 512 oscillates within a range of, for example, about +/−30 degrees from side to side at an oscillation frequency of, for example, about 10 Hz. Instantaneous flow fields obtained at an angle-of-attack of 10 degrees during a limit cycle over the one actuation period shown in FIGS. 7-9 are presented in FIGS. 10A-10E.

FIG. 10A shows a top view of a simulated flow field of an uncontrolled flow case (baseline) with pockets of flow separation bubbles 904 and 906 in an exemplary embodiment where no injected airflow is provided. Here, the exhaust stream 408 (FIG. 4) emanates from the cowling 308 and is directed to a right (as the figure is oriented). By comparing the flow separation bubbles 904, 906 on FIG. 10A to their counterparts in FIGS. 10B-10E, benefits of injected fluid/air such as the compressed fluid 336 are illustrated.

FIGS. 10B-10E show controlled flow cases at each time step. At each time step a momentary flow separation bubbles 904 and 906 is reduced relative to the baseline. In this embodiment, the time varying swiveling vane angle 340 changes periodically and is not fixed. The time varying swiveling vane angle 340 (FIG. 9) causes the time varying jet efflux 510 and 512 to eject out of the slots 316 and 318 respectively at the time varying swiveling vane angle 340. The time varying swiveling vane angle 340 causes a lag between a location of the time varying jet efflux 510 and 512 and a destruction of the flow separation bubble 904/906. In a time-average sense the flow separation is reduced as explained in more detail in the context of discussion of FIG. 22 below. In this manner, a favorable interaction between the injected flow such as the time varying jet efflux 510 and 512 and engine exhaust such as the exhaust stream 344/408 has major impact on USB performance.

FIGS. 11, 12A, 12B, and 13 are illustrations of an exemplary operation of a flow separation suppression system 400 showing a flow pattern caused by a non-periodic motion of the non-time varying swiveling vanes 320 at the non-time varying swiveling vane angle 340 according to an embodiment of the disclosure. In some embodiments, the non-time varying swiveling vanes 320 are used for deflecting the non-time varying jet efflux 338 to the non-time varying swiveling vane angle 340, depending on the operational condition.

Each of the swiveling vanes 320 is configured to rotate to a side to actuate the non-time varying jet efflux 338 at the non-time varying swiveling vane angle 340 (FIG. 3) through each of the fluid ejection slots 312, 314, 316, and 318 to produce the vectors 506, 508, 510 and 512.

Figure 11:
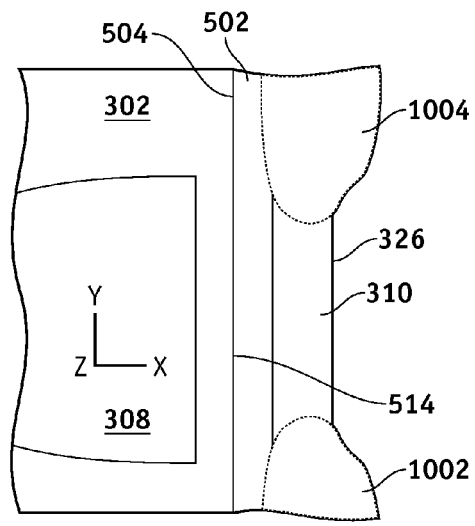
FIGS. 11, 12A, 12B and 13 are illustration of an exemplary operation of a flow separation suppression system showing a flow pattern caused by a non-periodic motion of non-time varying swiveling vanes at a non-time varying swiveling vane angle according to an embodiment of the disclosure.
Figure 12A:
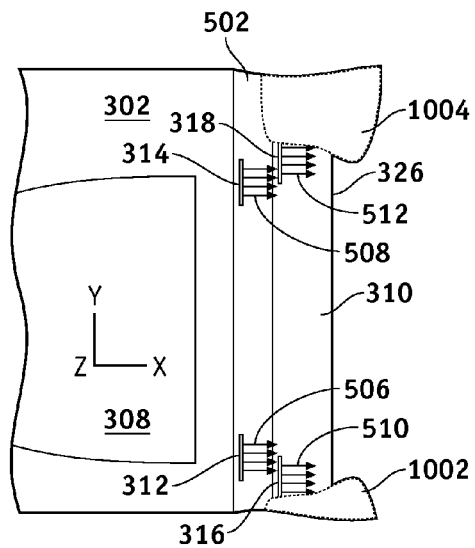
Figure 12B:
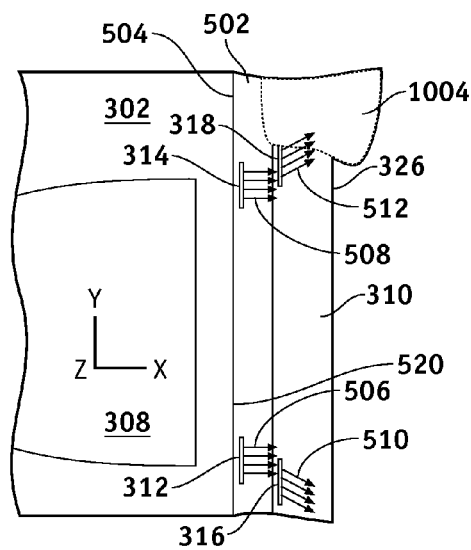

Some of benefits provided through application of compressed fluid 336 on the upper flap surface 324 are shown in FIGS. 11, and 12A-12B. A top view of a simulated flow field with pockets of separation bubbles 1002, 1004 in an exemplary embodiment where no injected airflow is provided is shown in FIG. 11. Here, the exhaust stream 408 emanates from the cowling 308 and is directed to a right (as the figure is oriented). By comparing the flow separation bubbles 1002, 1004 on FIG. 11 to their counterparts in FIGS. 12A, 12B and 13, benefits of injected fluid/air such as the compressed fluid 336 at the non-time varying swiveling vane angle 340 is illustrated.

FIG. 12A, for example, shows one embodiment wherein four fluid ejection slots 312, 314, 316, 318 (fluid injectors) are actuated to encourage flow attachment to the flap 310 through application of the jet efflux 506, 508, 510, 512. As a result of this pattern, smaller flow separation bubbles 1002, 1004 are pushed away from a controlled exhaust plume 1802 (FIG. 18) that is produced aft of the cowling 308. In the embodiment of FIG. 12A, the fluid ejection slots 312 and 316 are associated with the left side edge 516 of the aft edge 514 of the cowling 308, and the fluid ejection slots 314 and 318 are associated with a right side edge 518.

Figure 13:
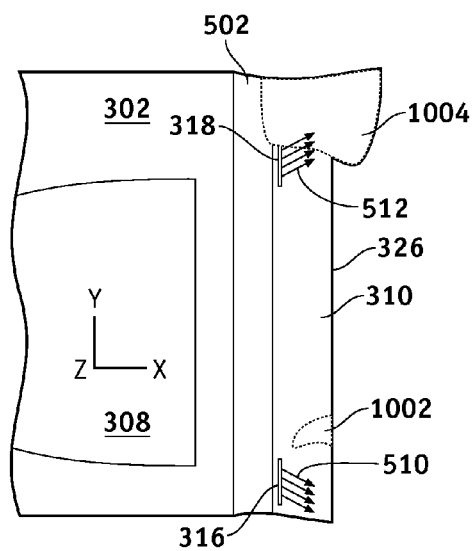

Furthermore, the fluid ejection slots 312 and 314 may be displaced on the flap 310 on or near a flap leading edge 504 or other structure, whereas the fluid ejection slots 316 and 318 may be located on the flap 310 on or near the flap trailing edge 326, or otherwise located "downstream" of the fluid ejection slots 312, 314. The fluid ejection slots 316 and 318 are configured in FIG. 12B to eject radially outward from the aft edge 514 (FIG. 5) of the cowling 308 (in comparison to groups 312 and 314, respectively) although other embodiments could exhibit more or less alignment between fluid ejection slots. FIG. 13 similarly shows the fluid ejection slots 316, 318 and resulting vectors 510, 512 in an alternate configuration without fluid ejection slots 312 and 314.

By comparing the positions and sizes of the flow separation bubbles 1002 and 1004 in FIG. 11 with those in FIG. 12A, it is apparent that the injected airflow represented by jet efflux 506, 508, 510 and 512 enhances flow attachment, thereby resulting in mild three dimensional effects and enhanced streamlining of the exhaust stream 408 from the engine 304 around the upper flap surface 324 of the flap 310. Also, the exhaust stream 408 is allowed to spread across a wider section of the wing 302/flap 310, thereby augmenting lift generated by Coanda Effects.

Flow separation may further be suppressed by angling some or all of the injected airflow outwardly away from the controlled exhaust plume 1802, as illustrated by flow separation shown by the flow separation bubbles 1002, 1004 in FIG. 12B. In the embodiment shown in FIG. 12B, injected airflows/jet efflux 510, 512 are directed outwardly at the non-time varying swiveling vane angle 340 (see FIG. 3) of approximately 30 degrees with respect to the downstream direction of the exhaust stream 408/344 (fluid flow 408/344), thereby reducing the flow separation bubbles 1002, 1004. As noted above, alternate embodiments may provide different numbers, groupings and/or arrangements of injected airflows. Engine exhaust stream, fluid flow, exhaust gas, and exhaust stream may be used interchangeably in this document.

FIG. 13, for example, omits the fluid ejection slots 312 and 314 and the associated swiveling vanes 320 shown in the other figures to reduce sizes of flow separation bubbles 1002, 1004 in comparison to the FIG. 11 embodiment. Many other arrangements and layouts could be created in a vast array of equivalent embodiments. For example, fluid ejection slots 312, 314, 316, 318 and the associated swiveling vanes 320 may extend from edge to edge of the cowling 308 in a direction that is more or less parallel to the flap trailing edge 326. Again, some or all of the injected airflows may be manually or automatically activated and deactivated during flight to adjust aircraft performance as desired.

Figure 14:
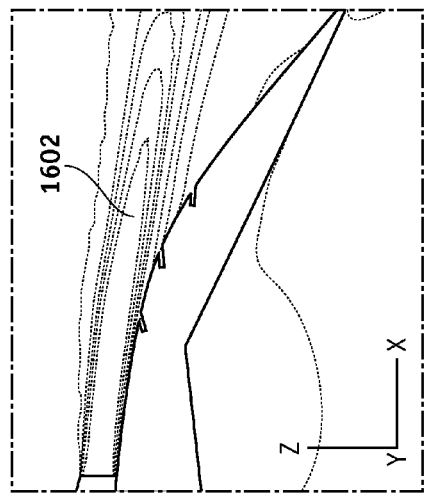
FIGS. 14-16 are illustrations of uncontrolled operations of an engine exhaust flow showing an uncontrolled exhaust flow of FIG. 11.
Figure 16:
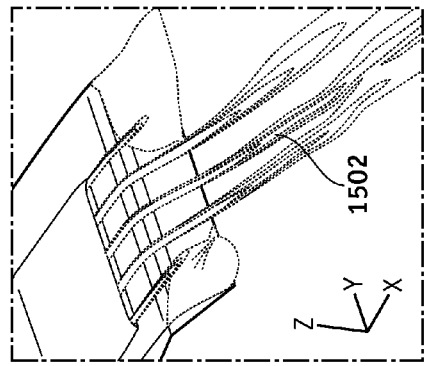

FIGS. 14-16 are illustrations of uncontrolled operations of an engine exhaust flow 1502 (uncontrolled exhaust plume 1502) showing the uncontrolled exhaust flow of FIG. 11. FIGS. 15-16 show vertical cuts through the exhaust flow 1502 of FIG. 11. The flow separation bubbles 1002 and 1004 represent a flow separation as a result of a low exhaust turning 1602.

Figure 17:
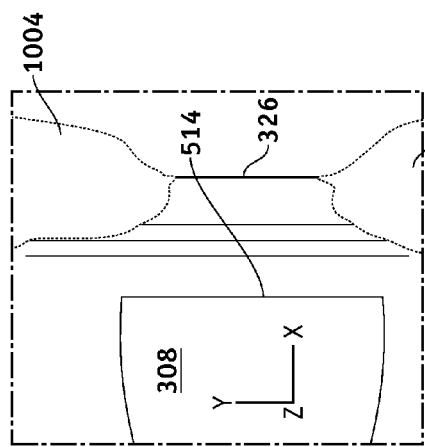
FIGS. 17-19 are illustrations of an exemplary operation of a flow separation suppression system showing a controlled exhaust flow of FIG. 12B caused by the non-periodic motion of the non-time varying swiveling vanes at the non-time varying swiveling vane angle according to an embodiment of the disclosure.
Figure 18:
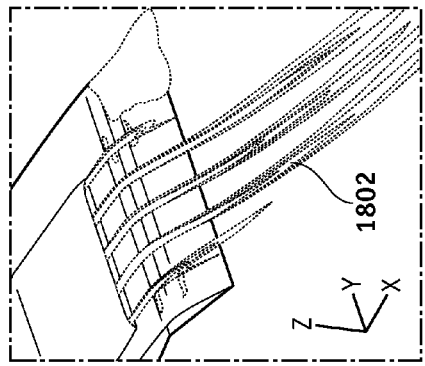
Figure 19:
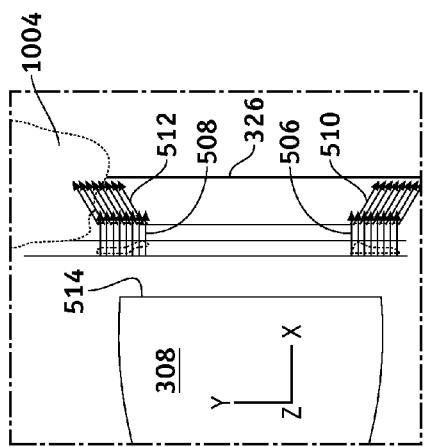

FIGS. 17-19 are illustrations of an exemplary controlled operation of the flow separation suppression system 400-600 showing a controlled exhaust flow 1802 of FIG. 12B caused by a non-periodic motion of the non-time varying swiveling vanes 320 at the non-time varying swiveling vane angle 340 according to an embodiment of the disclosure. FIGS. 18-19 show vertical cuts through the exhaust flow 1802 of FIG. 12B. A reduction in the flow separation bubbles 1002 and 1004 of FIG. 14 is shown as a result of a higher exhaust turning 1902 in response to actuation of the non-time varying swiveling vanes 320 at the non-time varying swiveling vane angle 340.

FIG. 20 is an illustration of an exemplary uncontrolled operation of an engine exhaust flow system 2000 showing the uncontrolled exhaust plume 1502 of FIG. 15 at the no injected fluid flow condition of FIG. 11. The flow separation bubbles 1002 and 1004 represent a flow separation as a result of the uncontrolled engine plume 1502.

FIG. 21 is an illustration of an exemplary controlled operation 2100 of the flow separation suppression system 400-600 showing the controlled exhaust plume 1802 at the jet efflux 510, 512 condition of FIG. 12B caused by the non-periodic motion of the non-time varying swiveling vanes 320 at the non-time varying swiveling vane angle 340 according to an embodiment of the disclosure. The flow separation bubbles 1002 and 1004 represent a reduction of the flow separation of the FIG. 20 as a result of the controlled exhaust plume 1802.

Figure 22:
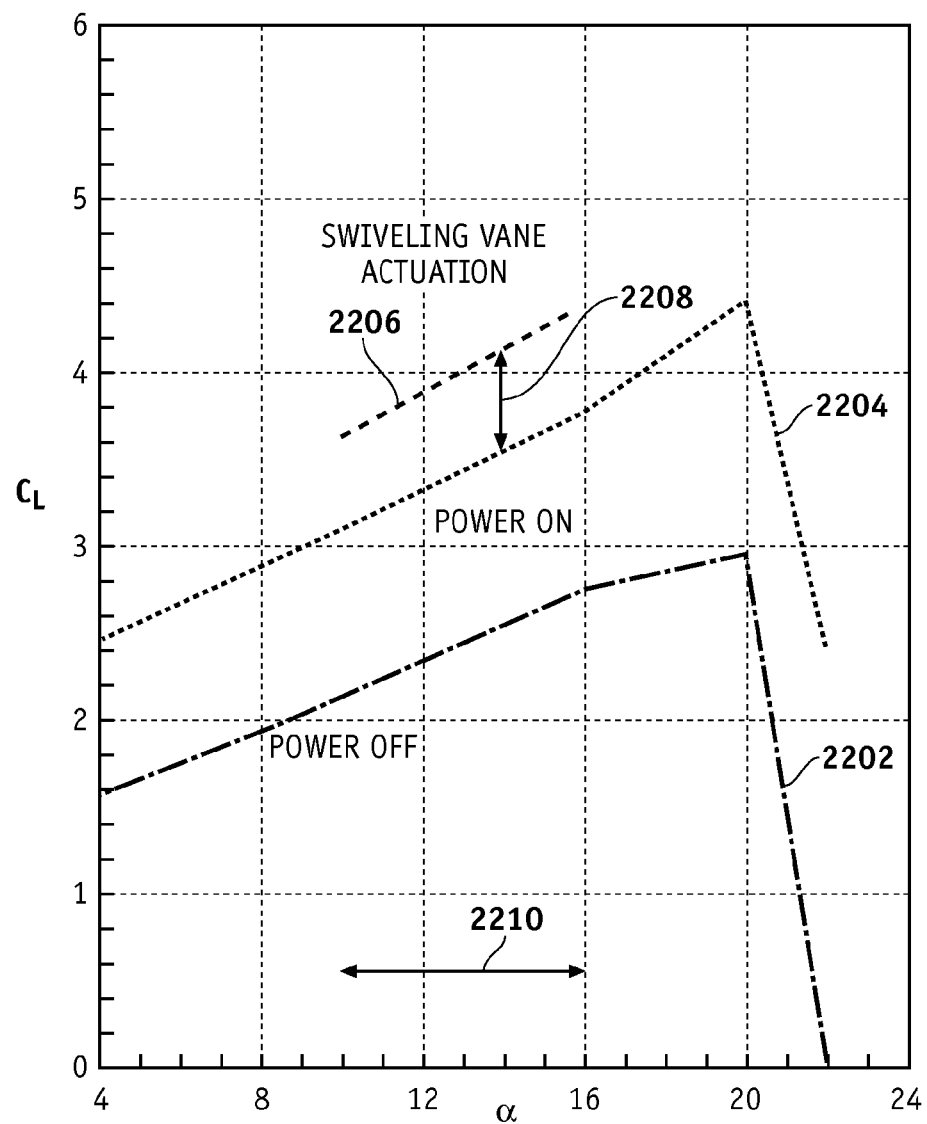
FIG. 22 is an illustration of an exemplary graph of a coefficient of lift $C_L$ vs. angle of attack $\alpha$ showing effect of swiveling jets on upper surface blowing (USB) performance according to an embodiment of the disclosure.

FIG. 22 is an illustration of an exemplary graph 2200 of a coefficient of lift $C_L$ vs. angle of attack α showing effect of swiveling jets on USB performance according to an embodiment of the disclosure. The graph 2200 shows an engine power off case 2202, a non-actuated case 2204 with engine power on, and a swiveling jet actuation curve 2206 with engine power on. A time-averaged lift augmentation 2208 shown by the swiveling jet actuation curve 2206 is about 0.6 relative to the non-actuated case 2204 in a linear lift range 2210. This effectiveness underscores an advantage of the swiveling jets such as the jet efflux 506, 508, 510 and 512 generated by the swiveling vanes 320 at a given operational condition.

Figure 23:
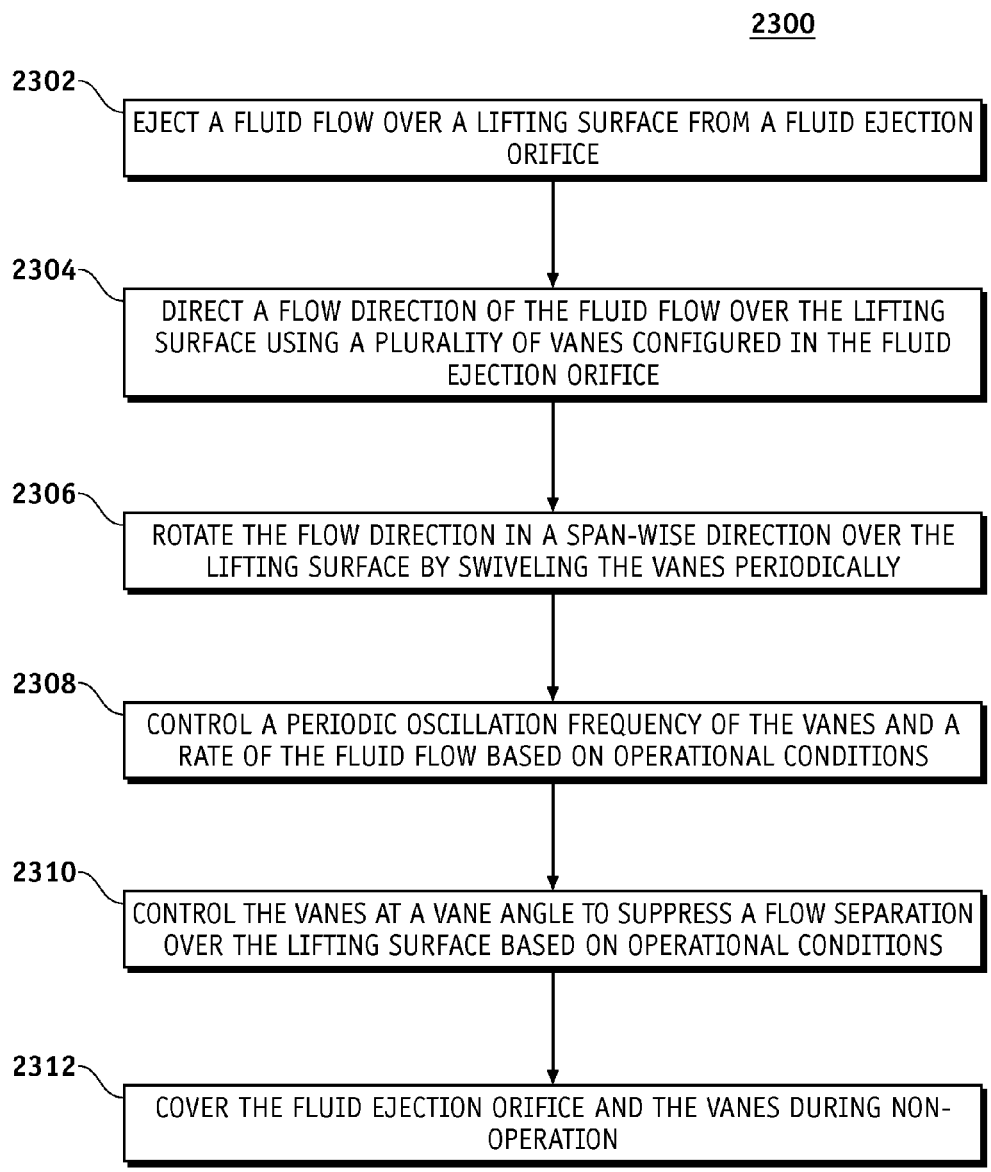
FIG. 23 is an illustration of an exemplary flowchart showing a process for flow separation suppression according to an embodiment of the disclosure.

FIG. 23 is an illustration of an exemplary flowchart showing a process for an enhanced lift generation via flow separation suppression according to an embodiment of the disclosure. The various tasks performed in connection with process 2300 may be performed mechanically, by software, hardware, firmware, computer-readable software, computer readable storage medium, or any combination thereof. It should be appreciated that process 2300 may include any number of additional or alternative tasks, the tasks shown in FIG. 23 need not be performed in the illustrated order, and the process 2300 may be incorporated into a more comprehensive procedure or process having additional functionality not described in detail herein.

For illustrative purposes, the following description of process 2300 may refer to elements mentioned above in connection with FIGS. 1-9, 10A-10E, and 11-22. In some embodiments, portions of the process 2300 may be performed by different elements of the system 400/500 such as, the rack 330, the swiveling vanes 320, the controller 422 etc. It should be appreciated that process 2300 may include any number of additional or alternative tasks, the tasks shown in FIG. 23 need not be performed in the illustrated order, and the process 2300 may be incorporated into a more comprehensive procedure or process having additional functionality not described in detail herein.

Process 2300 may begin by ejecting a fluid flow over a lifting surface from a fluid ejection orifice (task 2302).

Process 2300 may continue by directing a flow direction of the fluid flow over the lifting surface using a plurality of vanes configured in the fluid ejection orifice (task 2304).

Process 2300 may continue by rotating the flow direction in a span-wise direction over the lifting surface by one of: swiveling the vanes periodically (task 2306).

Process 2300 may continue by controlling a periodic oscillation frequency of the vanes such as the rotating vanes 320 and a rate of the fluid flow based on operational conditions (task 2308).

Process 2300 may continue by controlling the vanes at a vane angle to suppress a flow separation over the lifting surface based on operational conditions (task 2310).

Process 2300 may continue by covering the fluid ejection orifice and the vanes during non-operation (task 2312).

Figure 24:
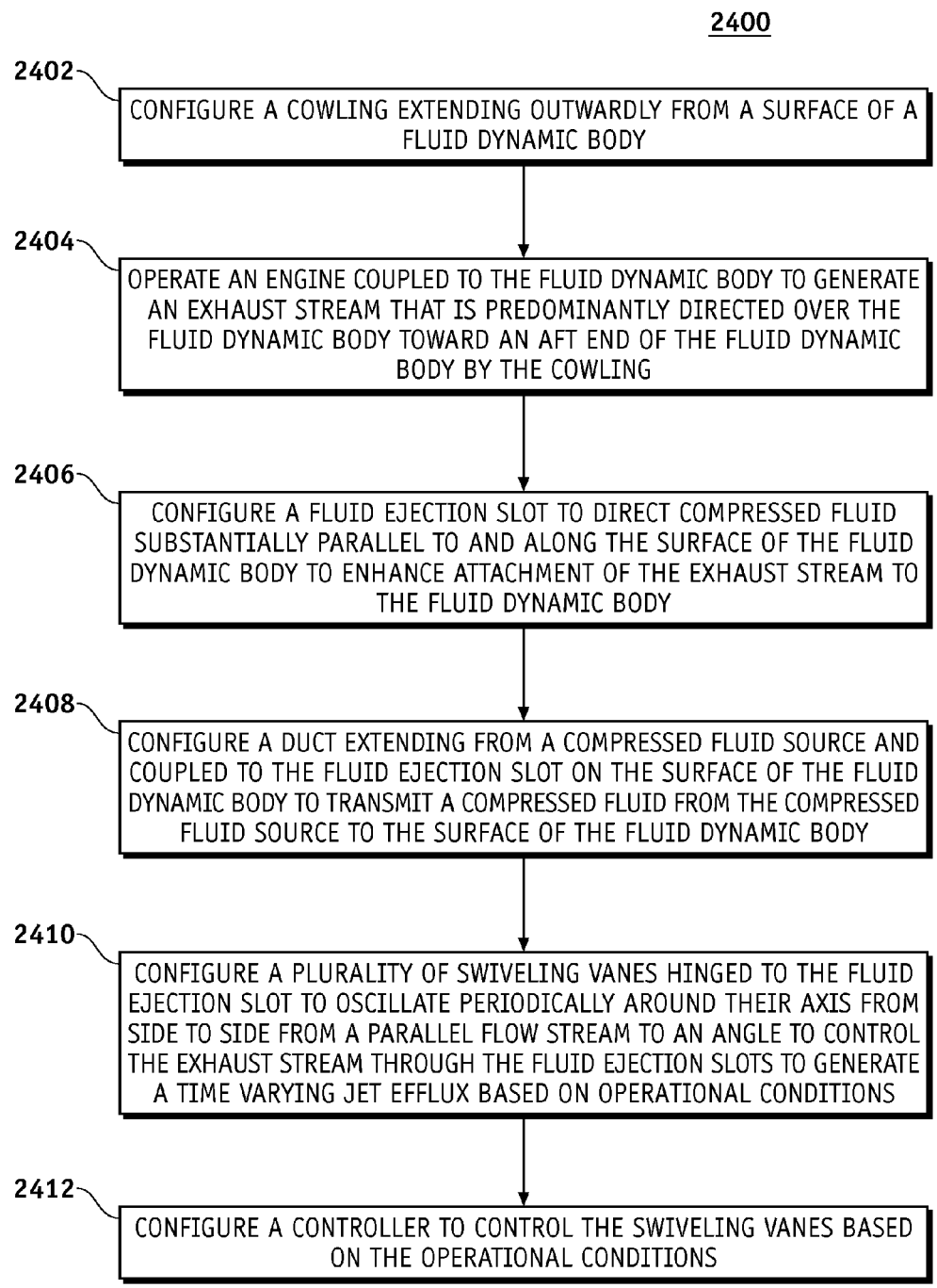
FIG. 24 is an illustration of an exemplary flowchart showing a process for configuring a flow separation suppression system according to an embodiment of the disclosure.

FIG. 24 is an illustration of an exemplary flowchart showing a process for configuring a flow separation suppression system for an enhanced lift generation according to an embodiment of the disclosure. The various tasks performed in connection with process 2400 may be performed mechanically, by software, hardware, firmware, computer-readable software, computer readable storage medium, or any combination thereof. It should be appreciated that process 2400 may include any number of additional or alternative tasks, the tasks shown in FIG. 24 need not be performed in the illustrated order, and the process 2400 may be incorporated into a more comprehensive procedure or process having additional functionality not described in detail herein.

For illustrative purposes, the following description of process 2400 may refer to elements mentioned above in connection with FIGS. 1-9, 10A-10E, and 11-22. In some embodiments, portions of the process 2400 may be performed by different elements of the system 400-600 such as: the rack 330, the swiveling vanes 320, the controller 422, etc. It should be appreciated that process 2400 may include any number of additional or alternative tasks, the tasks shown in FIG. 24 need not be performed in the illustrated order, and the process 2400 may be incorporated into a more comprehensive procedure or process having additional functionality not described in detail herein.

Process 2400 may begin by configuring a cowling extending outwardly from a surface of a fluid dynamic body (task 2402). For example but without limitation, the fluid dynamic body may comprise a lifting surface, a control surface, or other fluid dynamic body. For example, the fluid dynamic body may comprise, an extendable flap such as the flap 310 having the upper flap surface 324 where ducts 414-418 extends through the flap 310 to the upper flap surface 324. The controller 422 allows a portion of compressed fluid 336 to pass through the duct 410 and the ducts 414-418 while the flap 310 is extended, and to prevent a portion of the compressed fluid 336 from passing through the duct 410 when the flap 310 is not extended.

Process 2400 may continue by operating an engine coupled to the fluid dynamic body to generate an exhaust stream that is predominantly directed over the fluid dynamic body toward an aft end of the fluid dynamic body by the cowling (task 2404).

Process 2400 may continue by configuring a fluid ejection slot to direct a compressed fluid substantially parallel to and along the surface of the fluid dynamic body to enhance attachment of the exhaust stream to the fluid dynamic body (task 2406).

Process 2400 may continue by configuring a duct extending from a compressed fluid source and coupled to the fluid ejection slot on the surface of the fluid dynamic body to transmit the compressed fluid from the a compressed fluid source to the surface of the fluid dynamic body (task 2408). The compressed fluid may emanate from the fluid compressor 428. As mentioned above, the fluid compressor 428 may comprise, for example but without limitation, a compressor portion of the engine 304, a bleed air source of the engine 304, a fan portion of the engine 304, a dedicated electrical compressor, or other fluid compressor.

Process 2400 may continue by configuring a plurality of swiveling vanes hinged to the fluid ejection slot to oscillate periodically around their axis from side to side from a parallel flow stream to a vane angle to control the exhaust stream through the fluid ejection slots to generate a time varying jet efflux based on operational conditions (task 2410).

Process 2400 may continue by configuring the swiveling vanes at a vane angle to control the swiveling vanes based on the operational conditions (task 2412).

In this manner, the embodiments of the disclosure provide various means for a robust STOL capability over a range of operational conditions using swiveling jet actuators such as swiveling vanes.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for enhanced lift generation via flow separation suppression, the method comprising:
   ejecting a fluid flow over a lifting surface from a fluid ejection orifice;
   directing a flow direction of the fluid flow over the lifting surface using a plurality of vanes configured in the fluid ejection orifice; and
   rotating the flow direction in a span-wise direction over the lifting surface by swiveling the vanes.

2. The method of claim 1, further comprising controlling a periodic oscillation frequency of the vanes and a rate of the fluid flow based on operational conditions.

3. The method of claim 1, further comprising controlling the vanes at a vane angle to suppress a flow separation over the lifting surface based on operational conditions.

4. The method of claim 1, further comprising covering the fluid ejection orifice and the vanes during non-operation.

5. The method of claim 1, further comprising periodically moving a rack hinged to the vanes in a linear back and forth fashion in the span-wise direction to generate a linear rack motion to swivel the vanes.

6. The method of claim 5, further comprising cyclically rotating the vanes about their respective axis at a frequency and within predefined azimuth bounds in response to the linear rack motion.

7. The method of claim 5, further comprising controlling a motion of the rack to hold the vanes at a vane angle based on operational conditions to achieve best volume coverage and maximum upper surface blowing effect over a range of the operational conditions.

8. The method of claim 5, further comprising activating the vanes during takeoff, approach, or landing.

9. The method of claim 1, further comprising:
   directing an exhaust stream over the lifting surface over toward an aft end of the lifting surface by a cowling extending outwardly from the lifting surface; and directing the fluid flow through the fluid ejection orifice and substantially parallel to and along the lifting surface to enhance attachment of the exhaust stream to the lifting surface.

10. The method of claim 9, further comprising generating the exhaust stream from an engine.

11. The method of claim 9, further comprising receiving the fluid flow from a portion of the exhaust stream.

12. The method of claim 9, further comprising transmitting the fluid flow through a duct extending from a compressed fluid source to the fluid ejection orifice.

13. The method of claim 12, further comprising operating an extendable flap having a flap surface as the lifting surface, and transmitting the fluid flow through the duct through the extendable flap to the flap surface.

14. The method of claim 13, further comprising passing a portion of the fluid flow through the duct while the flap is extended, and preventing the portion of the fluid flow from passing through the duct when the flap is not extended.

15. The method of claim 9, further comprising operating an aircraft as an upper surface blowing aircraft, wherein the lifting surface comprises an upper surface of a wing of the aircraft.

16. The method of claim 1, further comprising emanating the fluid flow from a compressed fluid source comprising at least one of the group consisting of: a compressor portion of an engine, a bleed air source of the engine, a fan portion of the engine, and a dedicated electrical compressor.

17. The method of claim 1, further comprising switching a portion of the fluid flow to pass through a duct in a first operating state.

18. The method of claim 17, further comprising preventing the portion of the fluid flow from passing through the duct in a second operating state.

19. The method of claim 1, further comprising operating the vanes on a vertical axis anchored to the lifting surface.

20. The method of claim 1, further comprising operating the fluid ejection orifice configured as a fluid ejection slot.

* * * * *